United States Patent [19]
Di Bella et al.

[11] 3,981,806

[45] Sept. 21, 1976

[54] FLAME-RETARDANT EMULSION CONTAINING 1,1,2,3,4,4-HEXABROMOBUTENE-2

[75] Inventors: Eugene P. Di Bella, Piscataway, N.J.; Donald A. Keyworth, Houston, Tex.; Marvin Rosen, Warren, N.J.

[73] Assignee: Tenneco Chemicals, Inc., Saddle Brook, N.J.

[22] Filed: Sept. 15, 1975

[21] Appl. No.: 613,771

Related U.S. Application Data

[62] Division of Ser. No. 423,564, Dec. 10, 1973.

[52] U.S. Cl. .................................. 252/8.1; 8/115.6; 8/116 R; 427/434; 427/439
[51] Int. Cl.² ............................................ C09K 3/28
[58] Field of Search ...................................... 252/8.1

[56] References Cited
OTHER PUBLICATIONS
Walker et al., Chem. Abs., vol. 77, 87821e, 1972.

*Primary Examiner*—Leland A. Sebastian
*Attorney, Agent, or Firm*—Evelyn Berlow

[57] ABSTRACT

An emulsion suitable for use as a flame-retardant for textile materials is prepared by dissolving 1,1,2,3,4,4-hexabromobutene-2 in an N-alkylpyrrolidinone in which the alkyl group has from 1 to 5 carbon atoms to form a solution containing from 15 to 50% by weight of 1,1,2,3,4,4-hexabromobutene-2, diluting this solution with an aromatic hydrocarbon, and mixing the resulting solution with a non-ionic emulsifying agent and water to form the emulsion.

12 Claims, No Drawings

FLAME-RETARDANT EMULSION CONTAINING 1,1,2,3,4,4-HEXABROMOBUTENE-2

This is a division of our copending application Ser. No. 423,564, which was filed on Dec. 10, 1973.

This invention relates to stable emulsions that can be applied to textile fibers and fabrics to render them resistant to burning. It further relates to emulsions that contain a flame-retarding amount of 1,1,2,3,4,4-hexabromobutene-2.

Textile fibers and fabrics are usually flammable and readily ignitable. Because of the fire hazard inherent in their use, there has developed in recent years an increasing need to make textile materials more resistant to burning. A number of compounds have been proposed as flame-retardants for textiles, but none has proven to be entirely satisfactory in this application. Some of the proposed flame-retardants are water soluble. While they are useful for limited purposes, these compounds provide only temporary flame-retardance because they are lost when fabrics to which they have been applied are subjected to repeated washings or to conditions of high humidity. Fabrics coated with urea-formaldehyde resins or other thermosetting resins have longer lasting flame-retardant properties, but they have the disadvantage of being stiff and having reduced resistance to abrasion. Other flame-retardant compounds are undesirable because the amount required to provide the desired degree of flame retardance is so great that it makes the process too costly. Additives that are physically mixed with or chemically incorporated into the polymer before it is formed into fibers or non-woven sheets generally detract from the properties of the textile materials so that while the fire-retardant effect is relatively permanent the fabrics are more brittle, have lower tensile strength, and have less resistance to oxidative degradation.

In accordance with this invention, it has been found that emulsions containing 1,1,2,3,4,4-hexabromobutene-2 can be used to impart flame-retardant characteristics to a wide variety of textile materials without adversely affecting their physical properties. These emulsions, whose discontinuous phase is a solution containing about 5% to 25% by weight of 1,1,2,3,4,4-hexabromobutene-2 in a solvent mixture that contains 1 part to 5 parts by weight of an aromatic hydrocarbon per part by weight of an N-alkylpyrrolidinone whose alkyl group has 1 to 5 carbon atoms and whose continuous phase is water, are particularly effective as the flame-retardant for wool, cellulose acetate, polyester, and polyamide fibers and fabrics.

1,1,2,3,4,4-Hexabromobutene-2, which has the structural formula

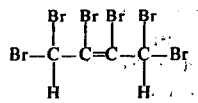

has a combination of properties that makes it valuable as a flame retardant for many textile materials. It is a crystalline compound that melts at about 180°C. and that contains 90 percent by weight of bromine. Because of its solid form, it is very well suited for use at relatively high levels in those applications in which plasticizer activity is undesirable because it has a deleterious effect on the hand and other properties of the fabrics. Because it is non-volatile, stable, and insoluble in water and in most common organic solvents, hexabromobutene-2 cannot be separated from textile materials by leaching, washing, or evaporation. In addition, hexabromobutene-2 is non-toxic, non-irritating, and biodegradable.

1,1,2,3,4,4-Hexabromobutene-2 is commercially available as a mixture that contains about 85 to 95 percent of the trans isomer and 5 to 15 percent of the cis isomer. The trans isomer is insoluble in water and in most organic solvents; the cis isomer is moderately soluble in acetone and certain other organic solvents. While the cis and trans isomers can be separated and used individually as the flame-retardant in textile compositions, it is preferred for reasons of economy and performance that a mixture of isomers that contains about 90 percent of the trans isomer and 10 percent of the cis isomer be used as the flame-retardant in these compositions.

1,1,2,3,4,4-Hexabromobutene-2 can be prepared easily and in good yield by the bromination of diacetylene. This reaction can be conveniently and safely carried out by contacting a gas stream that contains about 20 to 50 mole percent of diacetylene in an inert gas, such as nitrogen, with a dilute solution of bromine in water, carbon tetrachloride, or another inert solvent. The product of this reaction is a mixture of polybrominated compounds that contains about 75 to 80 percent by weight of 1,1,2,3,4,4-hexabromobutene-2, 15 to 23 percent by weight of 1,1,2,4-tetrabromobutene-2, and small amounts of dibromobutadienes. The crystalline hexabromobutene-2 may be separated from the product mixture by filtration. Hexabromobutene-2 prepared in this way contains 85 to 95 percent of the trans isomer and 5 to 15 percent of the cis isomer, and usually about 90 percent of the trans isomer and 10 percent of the cis isomer. This isomer mixture can be used without further treatment in emulsions that are used to impart flame-retardance to textile fibers and fabrics.

The emulsions of this invention can be used to impart flame-retardance to a wide variety of normally-flammable textile materials. They include, for example, fabrics and fibers of cellulose acetate and other cellulose esters; polyethylene terephthalate and other polyesters; nylon and other polyamides; polyolefins such as polyethylene, polypropylene, and polyisobutylene; polyacrylonitrile; polyacrylates that are homopolymers and copolymers of lower alkyl acrylates and lower alkyl methacrylates; polycarbonates; polyurethanes; wool; and mixtures thereof. Especially advantageous results have been obtained when emulsions containing hexabromobutene-2 were applied to cellulose acetate, wool, polyester, and polyamide fabrics and fibers.

The amount of the emulsion that is applied to a textile material is that which will provide the desired degree of flame-retardance. It is generally preferred to treat the textile material with an amount of the emulsion that will provide about 15 parts to 100 parts by weight of 1,1,2,3,4,4-hexabromobutene-2 per 100 parts by weight of the textile material.

Flame-retardant textile compositions are prepared by applying to the textile materials a stable emulsion that contains a flame-retarding amount of 1,1,2,3,4,4-hexabromobutene-2. The emulsion preferably contains from about 2 to 10% by weight of the flame retardant.

The stable emulsions that are applied to the textile material may be prepared by dissolving 1,1,2,3,4,4-hexabromobutene-2 in an N-alkylpyrrolidinone in which the alkyl group has from 1 to 5 carbon atoms to form a solution containing about 15 to 50% by weight of hexabromobutene-2. This solution is diluted with an aromatic hydrocarbon, such as benzene, toluene, xylene, or ethylbenzene, and then mixed with a non-ionic emulsifying agent and water to form the emulsion.

The amount of hexabromobutene-2 that can be dissolved in an N-alkylpyrrolidinone is largely dependent upon the temperature at which the solvent is maintained. When N-methylpyrrolidinone is used, the solution will contain a maximum of 17 percent by weight of hexabromobutene-2 at 25°C. and a maximum of about 50 percent by weight of hexabromobutene-2 at 100°C. It is generally preferred that N-alkylpyrrolidinone solutions that are saturated with hexabromobutene-2 be used in the preparation of the flame retardant emulsions, but less concentrated solutions can be used. The solution of hexabromobutene-2 in an N-alkylpyrrolidinone is then diluted with toluene or another aromatic hydrocarbon to form a solution that contains from 5 to 25 percent by weight of hexabromobutene-2 in a solvent that is a mixture containing from 1 to 5 parts by weight and preferably 2.5-4 parts by weight of the aromatic hydrocarbon per part by weight of the N-alkylpyrrolidinone, with the maximum amount of hexabromobutene-2 in the solution being dependent upon the temperature at which the solution is maintained. Surprisingly, the dilution of the saturated N-alkylpyrrolidinone solution with toluene, in which the solubility of hexabromobutene-2 ranges from 1 percent to 3 percent between 25°C. and 90°C., does not cause precipitation of the solute.

The resulting solution of hexabromobutene-2 in the aromatic hydrocarbon-N-alkylpyrrolidinone solvent is amenable to emulsification by conventional techniques to form oil-in-water emulsions that can be used to impart flame-retardance to textile materials. For example, the solution can be mixed with an aqueous solution of a non-ionic emulsifying agent to form the emulsion. Alternatively, a non-ionic emulsifying agent can be added to the solution to form an emulsifiable concentrate that can be used as such in certain flame-proofing procedures or mixed with water to form emulsions.

In most cases, 10% to 30% of a non-ionic emulsifying agent, based on the weight of hexabromobutene-2 in the solution, is used in the preparation of the emulsions.

The preferred emulsifying agents are ester-type non-ionic emulsifying agents, but other non-ionic emulsifying agents can be used. Examples of the ester-type non-ionic emulsifying agents include polyoxyethylene monocarboxylates, such as polyoxyethylene monolaurate, polyoxyethylene monopalmitate, and polyoxyethylene monostearate and polyoxyethylene sorbitan monocarboxylates such as polyoxyethylene sorbitan monolaurate and polyoxyethylene sorbitan monostearate.

The amount of water that is added to the hexabromobutene-2 solution or to the emulsifiable concentrate is that which will bring the hexabromobutene-2 content to the desired level. It is usually from 1 part to 5 parts and preferably from 1 part to 2 parts per part by weight of the solution or concentrate.

The resulting stable emulsions contain from 2 percent to 10 percent by weight of 1,1,2,3,4,4-hexabromobutene-2, with the maximum hexabromobutene-2 content dependent upon the temperature at which the emulsion is prepared and maintained. An emulsion that is stored at 30°C. may contain from about 2 percent to 4 percent by weight of hexabromobutene-2, while one that is stored at 80°C. may contain from about 2 percent to 9 percent by weight of hexabromobutene-2. It is generally preferred that the emulsion be prepared and stored at approximately the temperature at which it will be applied to textile materials.

In addition to the flame-retardant, the emulsions may contain synergists such as antimony oxide, softening agents such as ethylene glycol distearate, polymers such as polyvinyl acetate, and other materials that are commonly used in the treatment of textile fabrics and fibers.

The invention is further illustrated by the following examples.

EXAMPLE 1

To a solution of 82.5 grams of 1,1,2,3,4,4-hexabromobutene-2 in 100 grams of N-methylpyrrolidinone at 75°–80°C. was added 300 grams of toluene. The resulting solution was stirred and maintained at 75°–80°C. while a solution of 19 grams of polyoxyethylene sorbitan monolaurate (Tween 20) in 500 grams of water was added to it. There was obtained an emulsion that was stable at 75°–80°C. and that contained 8.2% by weight of hexabromobutene-2.

EXAMPLE 2

To a solution of 31 grams of 1,1,2,3,4,4-hexabromobutene-2 in 100 grams of N-methylpyrrolidinone at 50°C. was added 300 grams of toluene. The resulting solution was stirred while a solution of 4 grams of polyoxyethylene sorbitan monolaurate in 500 grams of water was added to it. There was obtained an emulsion that contained 3.8 percent by weight of hexabromobutene-2 and that was stable at 25°–30°C. for about one month.

EXAMPLE 3

To a solution of 31 grams of 1,1,2,3,4,4-hexabromobutene-2 in 100 grams of N-methylpyrrolidinone at 50°C. was added 300 grams of toluene. The resulting solution was stirred while 4 grams of polyoxyethylene sorbitan monolaurate was added to it. The resulting emulsifiable concentrate was mixed with 500 grams of water to form an emulsion that contained 3.8 percent by weight of hexabromobutene-2 and that was stable at 25°–30°C. for about one month.

EXAMPLE 4

Weighed 1 inch × 12 inches samples of fabrics were immersed for 5 minutes in the 1,1,2,3,4,4-hexabromobutene-2 emulsion whose preparation is described in Example 1 while the emulsion was gently agitated and maintained at 70°–80°C. The treated samples were squeezed free of excess liquid and air dried at room temperature. Each sample was reweighed and then subjected to the match test to determine its flammability qualitatively.

In the match test, the sample is suspended vertically lengthwise from a clamp. A mark is made in the middle of the sample. A wooden match is lit and used to ignite the bottom edge of the sample. This edge remains in the flame as long as the match burns, which is usually about 15 seconds. If the flame is extinguished within 5 seconds after the match is consumed and the sample does not burn beyond the center mark, the fabric is considered to be self-extinguishing.

For comparative purposes, fabric samples were treated with an emulsion that was prepared by the procedure of Example 1 except that it did not contain hexabromobutene-2 and then evaluated by the match test.

The fabrics tested and the results obtained are summarized in the following table:

| Fabric | % by Weight of Hexabromobutene-2 Added to Fabric | Flammability Rating* |
|---|---|---|
| Polyester | 42.9 | SE |
| " | 37.6 | SE |
| " (Control) | 0 | B |
| Polyester-Flat Type | 60.8 | SE |
| " | 51.3 | SE |
| " (Control) | 0 | B |
| Polyester-Double Knit, ribbed type | 92.8 | SE |
| " | 88.2 | SE |
| " (Control) | 0 | B |
| Polyamide-Taffeta | 22.6 | SE |
| " (Control) | 0 | B |
| Polyamide | 70.9 | SE |
| " | 65.5 | SE |
| " (Control) | 0 | B |
| Cellulose Acetate | 51.6 | SE |
| " | 50.3 | SE |
| " (Control) | 0 | B |
| Cellulose Acetate-Taffeta | 25.7 | SE |
| " | 22.5 | SE |
| " (Control) | 0 | B |
| Wool | 72.0 | SE |
| " | 67.4 | SE |
| " | 58.3 | SE |
| " (Control) | 0 | B |

*B = Burns
SE = Self-extinguishing

From the foregoing data, it will be seen that 1,1,2,3,4,4-hexabromobutene-2 is an effective flame retardant for cellulose acetate, polyamide, polyester, and wool fabrics.

Each of the other textile materials disclosed herein can also be rendered flame-retardant by applying to it an emulsion containing a flame-retarding amount of 1,1,2,3,4,4-hexabromobutene-2.

What is claimed is:

1. An emulsion suitable for use as a flame-retardant for textile materials whose discontinuous phase is a solution containing about 5% to 25% by weight of 1,1,2,3,4,4-hexabromobutene-2 in a solvent mixture that contains 1 part to 5 parts by weight of an aromatic hydrocarbon per part by weight of an N-alkylpyrrolidinone whose alkyl group has 1 to 5 carbon atoms and whose continuous phase is water.

2. An emulsion as defined in claim 1 that contains 2% to 10% by weight of 1,1,2,3,4,4-hexabromobutene-2.

3. An emulsion as defined in claim 1 that contains 1 part to 5 parts by weight of water per part by weight of said hexabromobutene-2 solution.

4. An emulsion as defined in claim 1 wherein the solvent mixture in which the hexabromobutene-2 is dissolved contains 2.5 parts to 4 parts by weight of toluene per part by weight of N-methylpyrrolidinone.

5. The process for the preparation of a stable emulsion that contains from about 2% to 10% by weight of 1,1,2,3,4,4-hexabromobutene-2 that comprises the steps of
   a. dissolving 1,1,2,3,4,4-hexabromobutene-2 in an N-alkylpyrrolidinone in which the alkyl group has 1 to 5 carbon atoms to form a first solution containing about 15% to 50% by weight of hexabromobutene-2;
   b. diluting the first hexabromobutene-2 solution with an aromatic hydrocarbon to form a second hexabromobutene-2 solution which contains about 5% to 25% by weight of hexabromobutene-2 in a solvent mixture that contains 1 part to 5 parts by weight of the aromatic hydrocarbon per part by weight of N-alkylpyrrolidinone; and
   c. mixing said second hexabromobutene-2 solution with a non-ionic emulsifying agent and water to form an emulsion.

6. The process of claim 5 wherein the second hexabromobutene-2 solution contains 5% to 25% by weight of hexabromobutene-2 in a solvent mixture that contains 2.5 parts to 4 parts by weight of toluene per part by weight of N-methylpyrrolidinone.

7. The process of claim 5 wherein the amount of water added in Step c is from 1 part to 5 parts by weight per part by weight of said second hexabromobutene-2 solution.

8. The process of claim 5 wherein the amount of water added in Step c is from 1 part to 2 parts by weight per part by weight of said second hexabromobutene-2 solution.

9. The process of claim 5 wherein the non-ionic emulsifying agent added in Step c is polyoxyethylene sorbitan monolaurate.

10. The process of claim 5 wherein the amount of non-ionic emulsifying agent added in Step c is 10% to 30%, based on the weight of hexabromobutene-2 in the solution.

11. The process of claim 5 wherein the solvent in which 1,1,2,3,4,4-hexabromobutene-2 is dissolved in Step a is N-methylpyrrolidinone.

12. The process of claim 5 wherein the aromatic hydrocarbon with which the hexabromobutene-2 solution is diluted in Step b is toluene.

* * * * *